United States Patent [19]
Hosoya et al.

[11] Patent Number: 6,021,128
[45] Date of Patent: Feb. 1, 2000

[54] ASYNCHRONOUS TRANSFER MODE SWITCHING SYSTEM

[75] Inventors: Mutsumi Hosoya, Fujimi; Morihito Miyagi, Kodaira; Willy Hioe, Kokubunji; Akihiko Takase; Takahiko Kozaki, both of Tokyo; Toshikazu Nishino, Kawasaki, all of Japan

[73] Assignee: Hitachi, Ltd., Tokyo, Japan

[21] Appl. No.: 08/814,649

[22] Filed: Mar. 10, 1997

[30] Foreign Application Priority Data

Mar. 11, 1996 [JP] Japan ................................ 8-053446

[51] Int. Cl.[7] .......................... H04L 12/50; H04L 12/56; H04Q 11/00
[52] U.S. Cl. ........................ 370/380; 370/381; 370/392; 370/413; 370/419; 370/427
[58] Field of Search ..................... 370/352, 368, 370/380, 381, 392, 395, 396, 397, 412, 413, 419, 427

[56] References Cited

U.S. PATENT DOCUMENTS

| | | | |
|---|---|---|---|
| 4,064,370 | 12/1977 | Coonce et al. | 370/380 |
| 5,130,975 | 7/1992 | Akata | 370/416 |
| 5,241,536 | 8/1993 | Grimble et al. | 370/398 |
| 5,365,519 | 11/1994 | Kozaki et al. | 370/378 |
| 5,475,679 | 12/1995 | Munter | 370/395 |
| 5,577,038 | 11/1996 | Miyahara | 370/352 |
| 5,710,770 | 1/1998 | Kozaki et al. | 370/378 |
| 5,784,372 | 7/1998 | Faulds | 370/398 |
| 5,802,045 | 9/1998 | Kos et al. | 370/352 |

OTHER PUBLICATIONS

"Fast Packet Switch Architectures for Broad–Band Integrated Services Digital Network" by Fouad A. Tobagi, Proceedings of the IEEE, vol. 78 No. 1, Jan. 1990, pp. 133–167.

"A 9.6Gb/s HEMT ATME Switch LSI for B–ISDN", by Y. Watanabe, et al 1992 IEEE GaAs IC Symposium pp. 295–298.

Primary Examiner—Douglas W. Olms
Assistant Examiner—Seema S. Rao
Attorney, Agent, or Firm—Antonelli, Terry, stout & Kraus, LLP

[57] ABSTRACT

An asynchronous transfer mode switching system for improving switching throughput and averting complicated and difficult timing design. In operation, synchronous cell strings from external transmission lines are converted to asynchronous cell strings which are switched by a space-division switch array. The switched asynchronous cell strings are reconverted to synchronous cell strings for output onto external transmission lines. The space-division switch array comprises a plurality of unit switches in stages, each unit switch having input terminals and output terminals. The unit switches each include a timing control circuit that causes a switching operation to start upon detecting two states concurrently: a stored state of a cell to be switched, and a storage-ready state of a destination for the switched cell. The scheme allows the system to operate in an asynchronous manner.

23 Claims, 7 Drawing Sheets

ASYNCHRONOUS TRANSFER MODE SWITCHING SYSTEM

BACKGROUND OF THE INVENTION

The present invention relates to an asynchronous transfer mode switching system adapted advantageously to high-speed transmission of data including large quantities of computer data and image data.

A steady expansion of today's information-oriented society has entailed significant increases in the volume of high-speed data including computer signals and digitized video signals in addition to conventional low-speed data such as telephone and fax signals. To cope with the need to transmit all these data efficiently in any way desired, intensive efforts have been made to develop communication systems of broader band characteristics and ever-higher levels of efficiency. Already, in the field of local networks, broadband communication systems are in place and operating at a growing number of installations. In the field of public telecommunication, varieties of networks (e.g., telephone, facsimile and data communication networks) each separately developed are beginning to be integrated into what is known as a B-ISDN (Broadband Integrated Services Digital Network). The B-ISDN unites the existing networks in a broadband framework by means of standardized interfaces.

One technique now drawing attention as an effective way for implementing broadband communication systems and the B-ISDN is a digital communication technique that functions in asynchronous transfer mode (abbreviated to "ATM" hereunder). The ATM communication technique utilizes fixed-length packets called cells whose length is set to 53 bytes each by international standards. Of the 53 bytes making up a cell, 48 bytes are used for transmitting data proper and the remaining five as a header for accommodating address information.

Whereas conventional time-division communication setups fix the number of cells and the time slots assigned to these cells for each communication channel within a frame of a constant cycle, the ATM communication technique allows the cell count and the time slot assignments to vary depending on the quantity of data to be transmitted and on the data transfer rate in effect. More specifically, the ATM communication technique effects data transmission by having the cells accommodated in the time slots determined by the standard clock cycle of the network in question. Because each cell is accommodated whenever an empty time slot is found, the time slots are necessarily varied. That is, the cells are transferred asynchronously (i.e., in asynchronous transfer mode). Cells for communication channels are arranged into a string according to the number of cells and the sequence in which the cells are generated. The ATM communication technique deals adequately with any abrupt demand for the transfer of huge quantities of data, and performs data transfers in accordance with specific data rates required.

Figure 7:
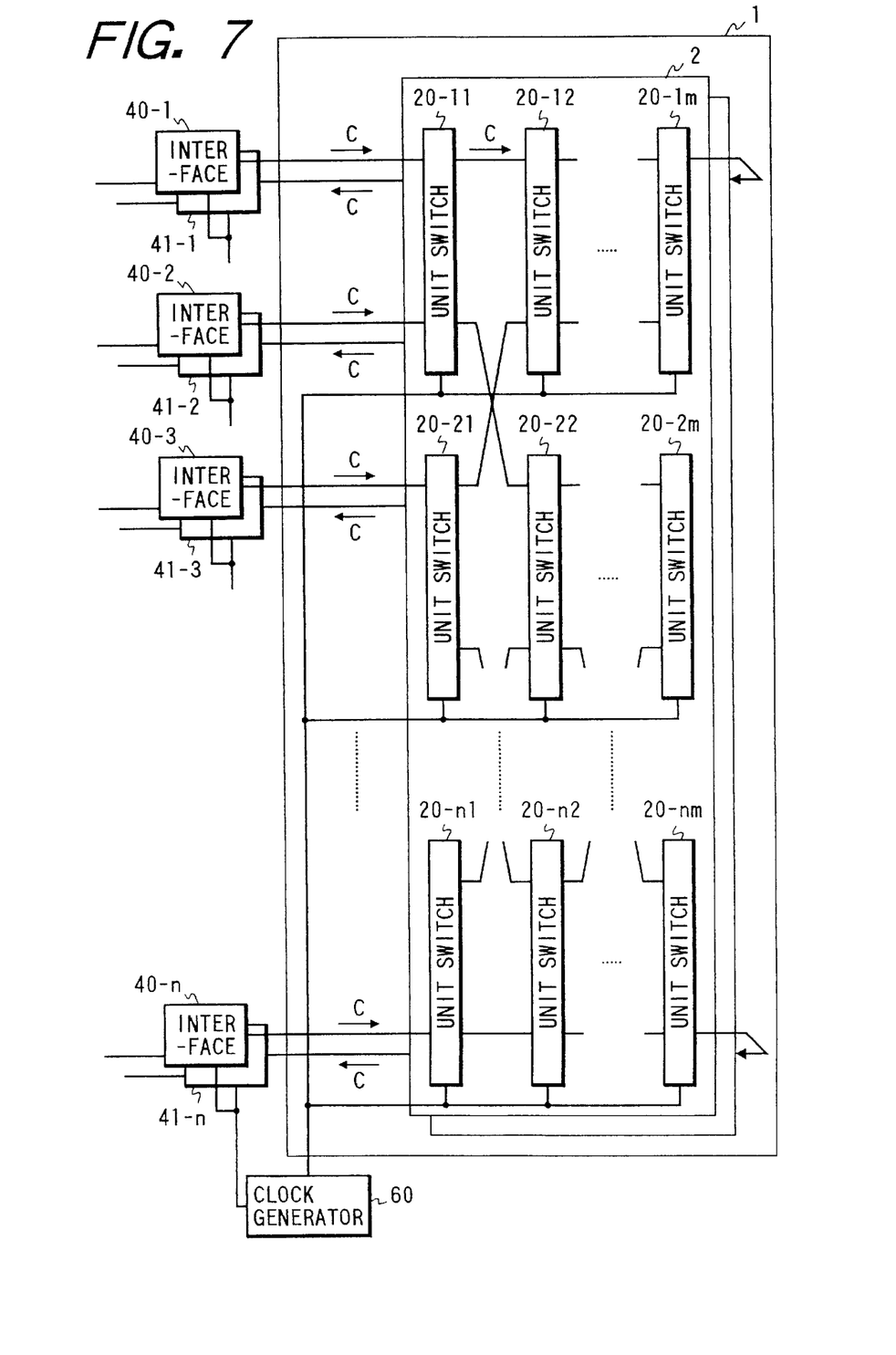
FIG. 7 is a block diagram of a conventional asynchronous transfer mode switching system.

FIG. 7 shows a typical switching system disclosed in the Proceedings of the IEEE, Vol. 78, No. 1 (January 1990), pp. 133–167. In FIG. 7, a switch 1 comprises a space-division switch array 2 (whose input side alone is depicted here for simplification) having stages of numerous unit switches 20-11 through 20-nm. The unit switches 20 include input terminals and output terminals (generally constituting a 2-input, 2-output terminal makeup), and are interconnected as shown according to a desired design concept. The input terminals of each of the unit switches 20-11 through 20-n1 in the first stage (input stage) are connected to the output terminals of any one of input interface circuits 40-1 through 40-n. The output terminals of each of the unit switches in the last stage (output stage, not shown) are connected to the input terminals of any one of output interface circuits 41-1 through 41-n.

The input interface circuits 40-1 through 40-n are each connected to any one of n transmission lines (not shown) on the input side. These circuits are used to remove overhead information (sync signal, error control signal, monitor signal, etc.) from a cell string which is synchronous with the system clock so as to extract the string alone that is the synchronous cell string C for output.

The synchronous cell strings C (simply called "cell strings C" hereunder) from the transmission lines are sent into the unit switches 20-11 through 20-n1 of the first stage via the input interface circuits 40-1 through 40-n. The cell strings C are subjected to a predetermined cell switching operation (i.e., selective switching of transfer channels) in accordance with the address information held in the headers of individual cells. After that, the switched cell strings C are output from the unit switches of the last stage, not shown. The switched cell string C thus output is sent to an appropriate one of the output interface circuits 41-1 through 41-n. In turn, the output interface circuits 41-1 through 41-n add overhead information to the switched cell strings C (the switched cell string C comprises cells for a communication channel set for the same destination), thereby converting the switched cell strings C into transfer-ready signals. Each of the output interface circuits 41-1 through 41-n is connected on the output side to an external transmission line (not shown) linked to a predetermined destination. The converted signals are placed onto the external transmission lines for specific destinations.

Figure 8:
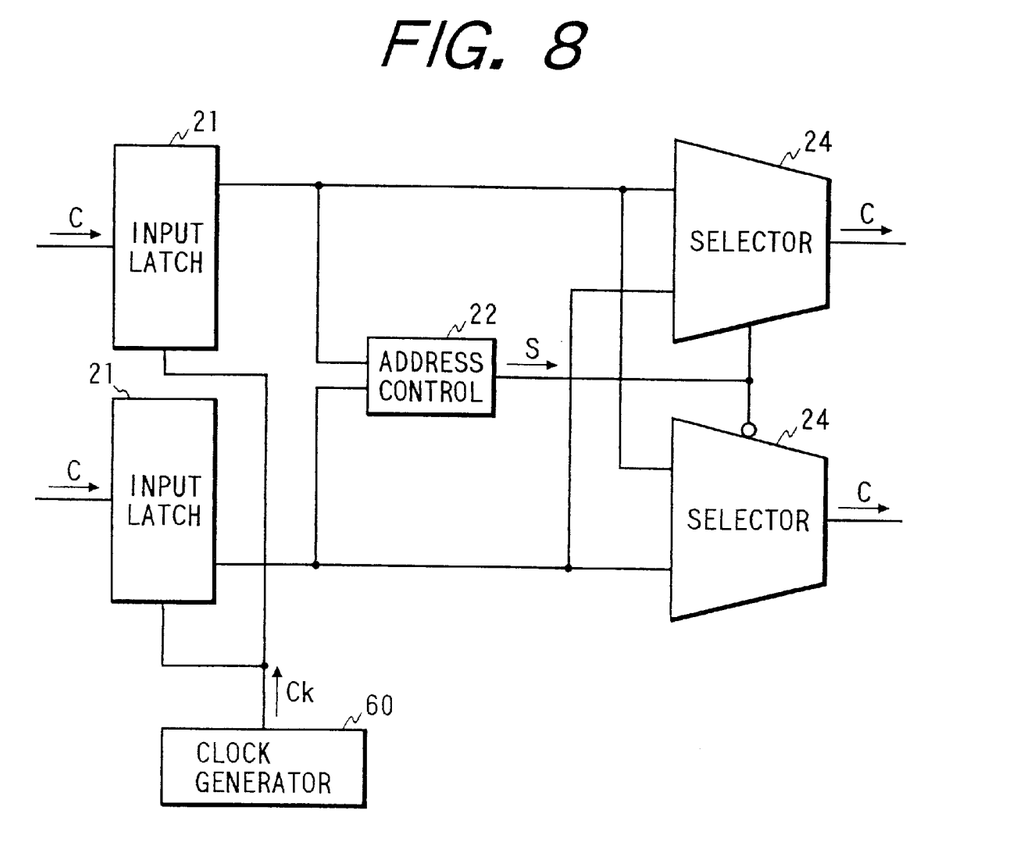
FIG. 8 is a circuit block diagram of a unit switch used by the conventional switching system in FIG. 7.

The unit switches 20-11 through 20-nm are identical in their structure. FIG. 8 depicts the structure of one unit switch 20. A switching operation is carried out by a pair of selector circuits 24 under control of an address control circuit 22. The input cell strings C are stored temporarily in a pair of input latch circuits 21. Every time a switching operation is performed, the input latch circuit 21 reads one cell. Given the cell read by the input latch circuit 21, the address control circuit 22 interprets the address information in the header of the cell to determine its destination and outputs a selector control signal S accordingly to control the selector circuits 24. After being switched by the selector circuits 24, the cells are sent to the unit switches of the next stage, not shown in FIG. 8. The input latch circuits 21 are fed with clock pulses Ck from a clock generator 60. The input latch circuits 21 store and read each cell in synchronism with the clock pulses Ck. On receiving the cells from the input latch circuits 21, the selector circuits 24 perform the switching operation in synchronism with the clock pulses Ck to output synchronous cells.

The conventional switching method illustrated in FIGS. 7 and 8 is incapable of averting differences in arrival time between individual cells as they reach specific unit switches, the differences being attributable to the differences in length between transmission lines interconnecting the unit switches arranged side by side. Similar time differences also occur due to the disparities in characteristic between the devices constituting the unit switches as well as to the parameters of temperature and other ambient conditions. Clock pulses also entail differences in arrival time between individual circuits as the pulses travel over wires of different lengths. Time differences of the above kind can trigger malfunction in a switching system that operates synchronously as a whole using the same timing based on clock pulses. For this reason, conventional switching systems are required to set clock pulse cycles to allow for a predicted maximum time difference between cells. The settings are made to match the cell arrival times with the start of switching (set by the clock pulses), so that each switching operation takes place after the cell having the maximum time difference has arrived. Conventional system design thus requires setting the maximum time difference as a timing margin which is included in the clock pulse cycle. With the time differences absorbed by the time margin thus established, possible malfunction of the system is avoided. However, to have the timing margin included in the clock pulse cycle requires prolonging the clock cycle by that margin, which reduces the switching operation speed. The drop in the switching operation speed in turn lowers the throughput of data switching (i.e., number of all bits output by the switching system per unit time). Another disadvantage resulting from the inclusion of the timing margin is the need for complicated and difficult timing design.

SUMMARY OF THE INVENTION

It is therefore an object of the present invention to provide a novel switching system capable of circumventing the above and other disadvantages of the related art, improving switching throughput and averting complicated and different timing design.

In carrying out the invention and according to one aspect thereof, there is provided an asynchronous transfer mode switching system for extracting synchronous cell strings sent over external transmission lines, converting the extracted synchronous cell strings to asynchronous cell strings, and having the asynchronous cell strings switched by a space-division switch array. The switched asynchronous cell strings are reconverted to synchronous cell strings for outputs onto the external transmission lines. As with conventional systems, the space-division switch array comprises stages of numerous unit switches, each unit switch having input terminals and output terminals. The unit switches each include a timing control circuit which, acting asynchronously, causes a switching operation to start upon detecting two states concurrently: a stored state of a cell to be switched, and a storage-ready state of a destination for the switched cell.

A synchronous cell string is converted to an asynchronous cell string illustratively by a receiving synchronous conversion circuit comprising a memory, a write control circuit and a read control circuit. The memory temporarily stores a synchronous cell string. The write control circuit controls the writing of the synchronous cell string to the memory in accordance with a write signal supplied along with the synchronous cell string (the write signal is in the same synchronous relation to the synchronous cell string). The read control circuit controls the reading of an asynchronous cell string from the memory in accordance with an asynchronous read signal supplied from one of the unit switches in the first stage of the switch array. Likewise, an asynchronous cell string is reconverted to a synchronous cell string illustratively by a transmitting synchronous conversion circuit comprising a memory, a write control circuit and a read control circuit. In this case, too, the memory temporarily stores an asynchronous cell string. The write control circuit controls the writing of the cell string to the memory in accordance with a write signal supplied along with the switched asynchronous cell string from one of the unit switches in the last stage of the switch array (the write signal is in the same synchronous relation to the asynchronous cell string). The read control circuit controls the reading of a synchronous cell string from the memory in accordance with a synchronous read signal supplied from one of the output interface circuits.

The unit switches each include a timing control circuit that controls the start of a switching operation. The timing control circuit receives two timing signals, one indicating that each of the input latch circuits in the corresponding unit switch is ready to read a cell, the other signal indicating that input latch circuits of a destination for the switched cell are now free to store a cell. Given these signals, the timing control circuit performs Müller's C element-based logic operation (simply called "C operation" hereunder).

In the C operation, the output is "1" when all inputs are logical "1's", and the output is "0" when all inputs are logical "0's". Otherwise the output remains unchanged. To say that the C operation "holds" signifies that all inputs are logical "1's" and the output is a logical "1". The result of the C operation indicates the logical "1" output when the C operation holds.

The timing control circuit supplies a signal representing the C operation result to the switching-related circuits to start their operation. That is, the switching is started at the time when the timing control circuit outputs the C operation result. The time for the timing control circuit to output the C operation result is established by input of the above-mentioned timing signals. The timing control circuit never outputs the C operation result before all cells have been admitted to the input latch circuits so that the latter circuits are ready to output cells (i.e., all cells have arrived). This means that the inventive system is free from the effects of differences in arrival time between individual cells, the problem heretofore plaguing conventional clock pulse-based control schemes. According to the invention, there is no need to consider timing margins that are required by conventional systems. With the timing margins eliminated, the speed of switching is enhanced correspondingly and the throughput of the switching system in question is boosted thereby.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENT

One preferred embodiment of the invention and some of its components are illustrated in FIGS. 1 through 6. In these figures as well as in FIGS. 7 and 8, like reference numerals represent like or corresponding parts. With this embodiment, as will be described later in detail, each of unit switches 20-1 through 20-*n* making up a switch array 2 operates asynchronously.

Figure 1:
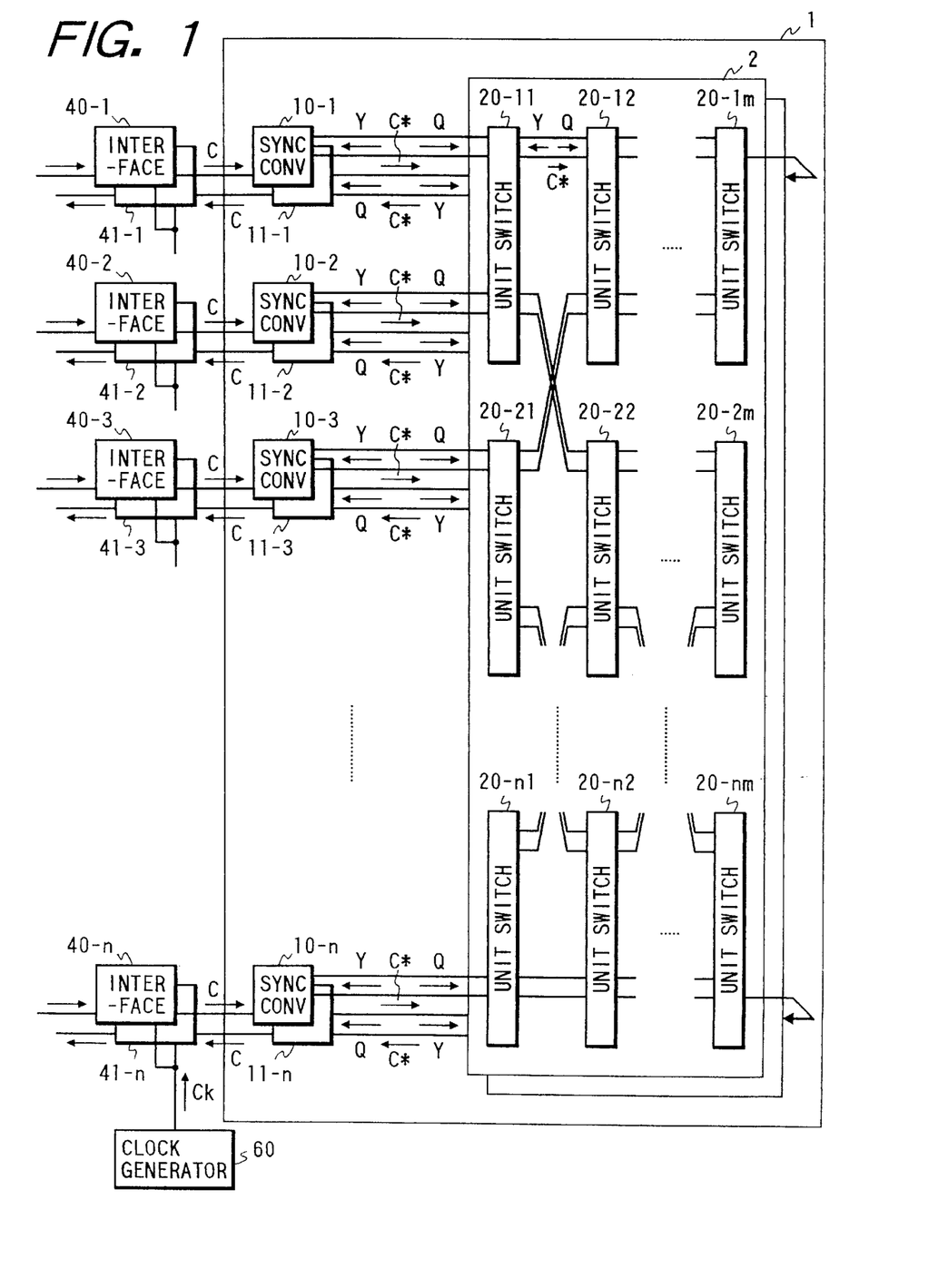
FIG. 1 is a schematic view of an asynchronous transfer mode switching system embodying the invention.

In FIG. 1, reference numerals 10-1 through 10-*n* denote receiving synchronous conversion circuits each installed between each of unit switches 20-11 through 20-*n*1 of a first stage and each of input interface circuits 40-1 through 40-*n*. References 11-1 through 11-*n* represent transmitting synchronous conversion circuits each installed between each of unit switches (not shown) of the last stage and each of output interface circuits 41-1 through 41-*n*. Clock pulses generated by a clock generator 60 are supplied only to the input interface circuits 40-1 through 40-*n* and the output interface circuits 41-1 through 41-*n* no other circuits are fed with the clock pulses. Unless otherwise noted, the expression "the switches in the preceding stage" hereunder will signify the unit switches or receiving synchronous conversion circuits located immediately upstream of and corresponding to a specific unit switch. Similarly, unless otherwise specified, the expression "the switches in the next stage" hereunder will signify the two unit switches or receiving synchronous conversion circuits located immediately downstream of and corresponding to a specific unit switch.

With this embodiment, cell strings C are admitted to the switching system 1 via the input interface circuits 40-1 through 40-*n* over external transmission lines (not shown). The cell strings C are converted to asynchronous cell strings C* (simply called cell strings C* hereunder) by the receiving synchronous conversion circuits 10-1 through 10-*n*. The cell strings C* are fed to the switch array 2 for switching. The switched cell string C* are reconverted to cell strings C by the transmitting synchronous conversion circuits 11-1 through 11-*n*. The reconverted cell strings C are output onto external transmission lines via output interface circuits 40-1 through 40-*n*.

Figure 2:
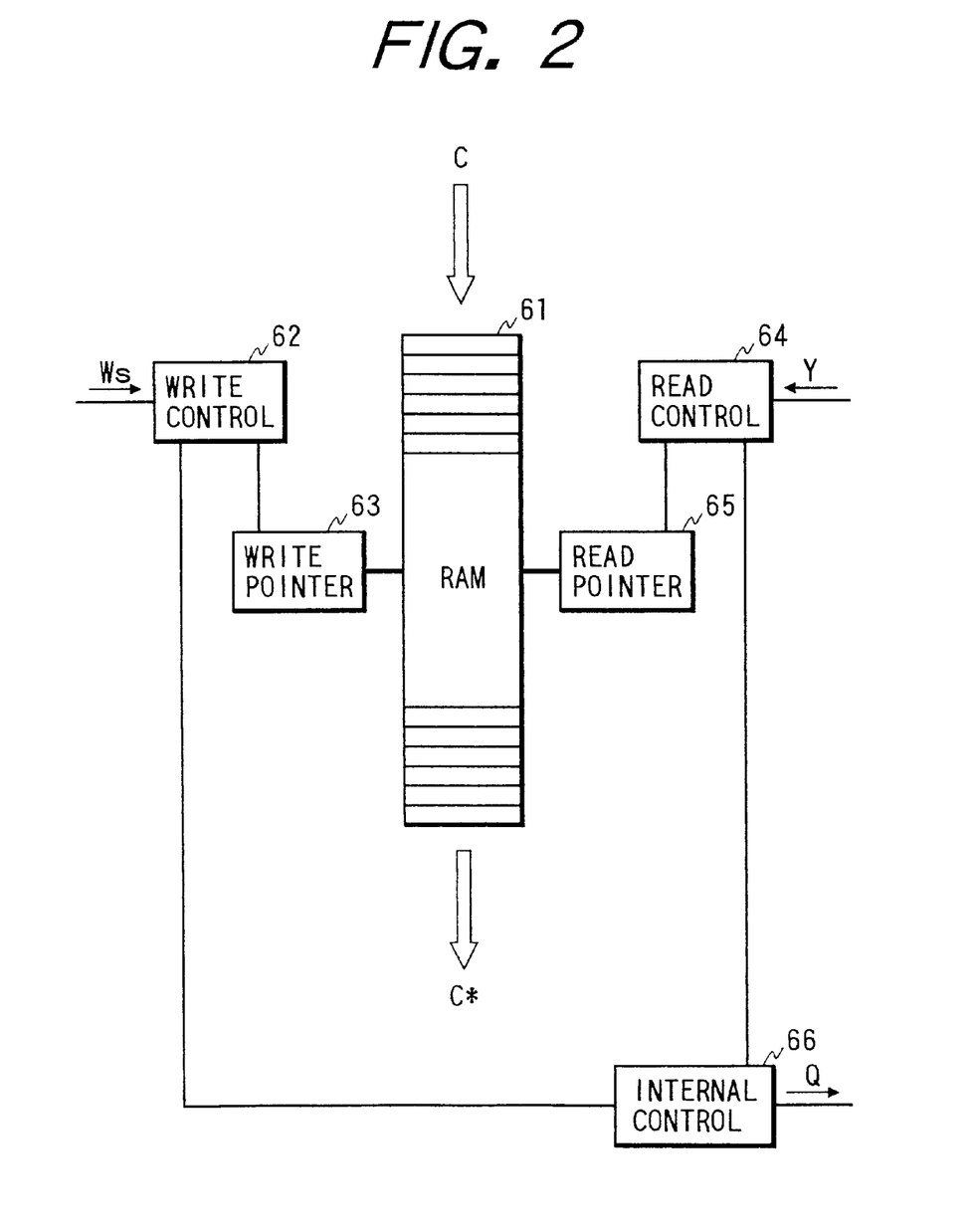
FIG. 2 is a circuit block diagram of a receiving synchronous conversion circuit used by the switching system in FIG. 1.

A typical receiving synchronous conversion circuit 10 is shown in FIG. 2. In FIG. 2, a random access memory (RAM) 61 temporarily stores a cell string C from the input interface circuit 40 (FIG. 1). The RAM 61 is a logical first-in first-out memory operating under actions of a write pointer 63 updated upon a write operation and a read pointer 65 updated upon a read operation. A write control circuit 62 controls the writing of a cell string C to the RAM 61 and operates in response to a write signal Ws sent together with the cell string C from the input interface circuit 40 (FIG. 1). A read control circuit 64 controls the reading of a cell string from the RAM 61 and operates in response to a ready signal Y from one of the unit switches 20-11 through 20-*n*1 (FIG. 1) in the first stage (the ready signal Y is an asynchronous timing signal permitting output of a cell string C* by designating a ready-to-store state). The ready signal Y acts as a read signal when used by the receiving synchronous conversion circuit 10. An internal state control circuit 66 detects the presence or absence of data (i.e., cell string) in the RAM 61 in concert with the write and read control circuits 62 and 64. If data is detected in the RAM 61, the control circuit 66 sends a request signal Q to one of the unit switches 20-11 through 20-*n*1 (FIG. 1) in the first stage (the request signal Q is an asynchronous signal requesting the receipt of a cell string C*).

Being a synchronous signal, the write signal Ws causes a cell string C to be written to the RAM 61 in synchronism with clock pulses. A cell string is read from the RAM 61 in the order in which the cells comprising the cell string were written thereto. The time to start the reading of the cell string is controlled by the asynchronous ready signal Y fed to the read control circuit 64. It follows that the cell string thus read out is an asynchronous cell string C*. A read operation of a cell string by the read pointer 65 follows a write operation of the cell string by the write pointer 64. The internal state control circuit 66 outputs a request signal Q every time one cell string has been read out, provided the read operation does not catch up with the writing operation thereof. Although the receiving synchronous conversion circuit shown in FIG. 2 does not use clock pulses, the write control circuit 62 and write pointer 63 may alternatively utilize clock pulses to control their internal operations.

Figure 3:
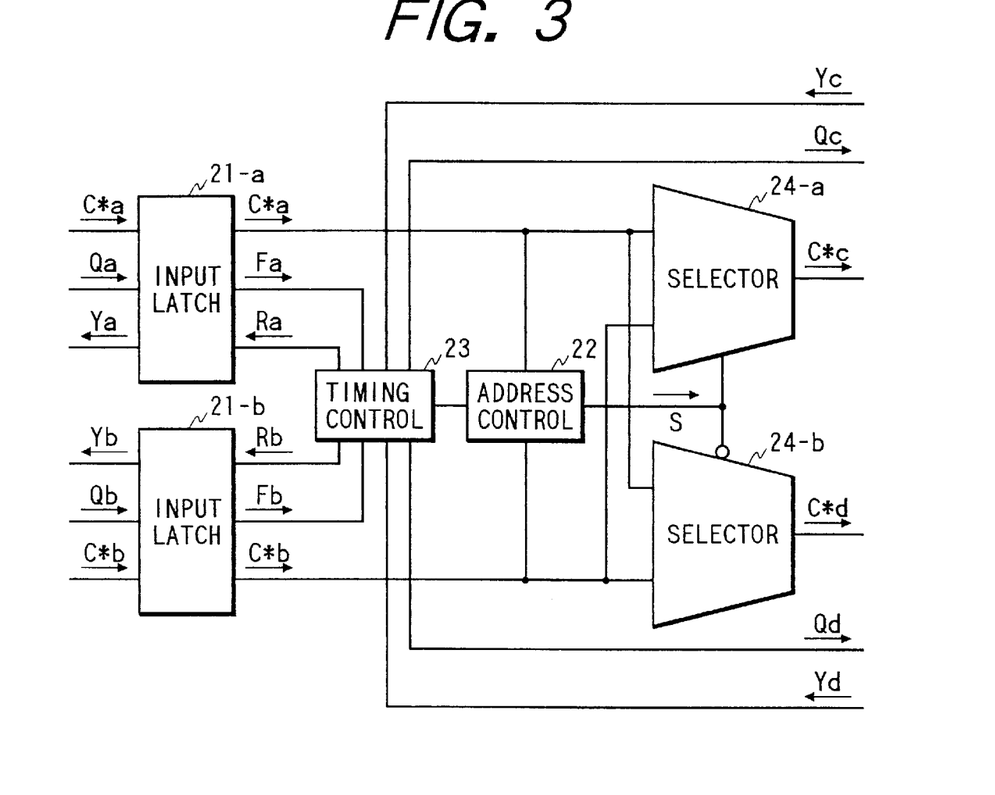
FIG. 3 is a circuit block diagram of a unit switch used by the switching system in FIG. 1.

FIG. 3 illustrates one of the unit switches 20-*a*, 21-*b* constituting the switch array 2 in FIG. 1. In FIG. 3, reference numeral 21 (21-*a*, 21-*b*) is a pair of input latch circuits for temporarily storing cell strings C* sent from the switches in the preceding stage; 24 (24-*a*, 24-*b*) is a pair of selector circuits for performing a cell switching operation; 22 is an address control circuit for controlling the selector circuit 24-*a*, 24-*b*; and 23 is a timing control circuit for controlling the time for the selector circuits 24-*a*, 24-*b* to start the switching operation.

The input latch circuits 21-*a*, 21-*b* used here each offer four functions: 1) receiving a request signal Q from one of the switches in the preceding stage; 2) transmitting a ready signal Y to one of the switches in the preceding stage; 3) receiving a read signal R from the timing control circuit 23 (the signal R orders the reading of the temporarily stored cell string C*); and 4) transmitting a full signal F to the timing control circuit 23 (the signal F is a timing signal indicating that the temporarily stored cell string C* is ready to be read). The selector circuits 24-*a*, 24-*b* are arranged to select one of the two cells received and to output the selected cells. Because the selector circuits 24-*a*, 24-*b* correspond respectively to the switches in the next stage (i.e., next destination for the cell in question), the cell is assigned its destination when selected, whereby the cell switching is carried out. The selector circuits 24-*a*, 24-*b* each switch one cell in one switching operation.

Figure 4:
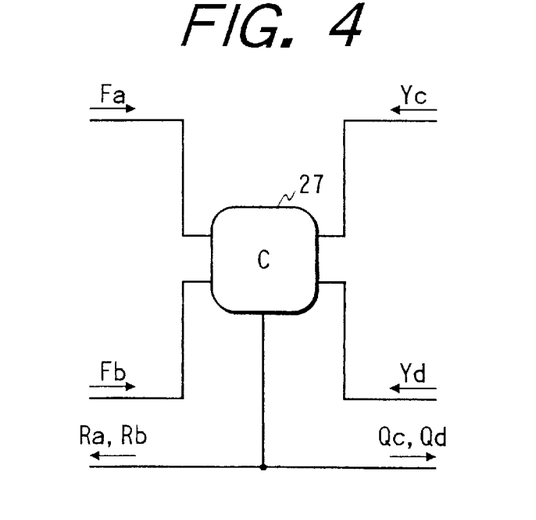
FIG. 4 is a circuit diagram of a timing control circuit used by the unit switch in FIG. 3.

The timing control circuit 23 used here offers four functions: 1) transmitting a request signal Q (Qc, Qd) to the switches in the next stage; 2) receiving a ready signal Y (Yc, Yd) from the switches in the next stage; 3) receiving a full signal F (Fa, Fb) from the input latch circuits 21-*a*, 21-*b*; and 4) transmitting a read signal R (Ra, Rb) to the input latch circuits 21-*a*, 21-*b*. As depicted in FIG. 4, the timing control circuit 23 is composed of a logic element 27 whose input terminals receive the full signals Fa, Fb from the input latch circuits 21-*a*, 21-*b* and the ready signals Yc, Yd from the switches in the next stage. The logic element 27 is a device that executes the above-mentioned C operation. The timing control circuit 23 outputs the read signals Ra, Rb to the input latch circuits 21-*a*, 21-*b* and the request signals Qc, Qd to the switches in the next stage (see FIG. 3).

Figure 5:
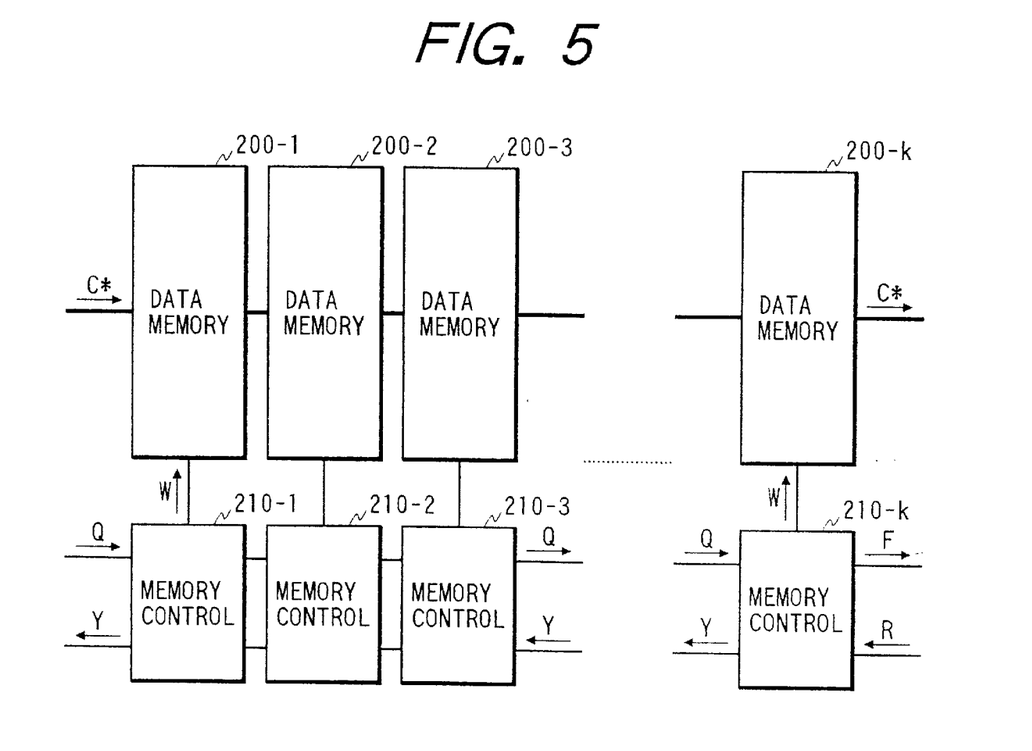
FIG. 5 is a circuit block diagram of an input latch circuit used by the unit switch in FIG. 3.

An example of the input latch circuits 21-*a*, 21-*b* included in FIG. 3 is illustrated in FIG. 5. With this embodiment, each input latch circuit is made of a first-in first-out memory described in the Papers Submitted to the GaAs Symposium held by the IEEE in 1992, pp. 295–298. In FIG. 5, reference numerals 200-1 through 200-*k* denote a series of data memories connected in series, and 210-1 through 210-*k* represent a series of memory controllers for individually controlling these data memories. Each data memory has a capacity for accommodating a single cell (of 53 bytes). The data memory capacity may be varied as long as the capacity is large enough to hold a single cell.

The data memories 200-1 through 200-*k* are interconnected by cell transmission lines for transferring a cell from one memory to another. The data memory 200-1 in the first stage is wired so as to receive a cell string C* from one of the switches in the preceding stage. The data memory 200-k in the last stage is wired to output the cell string C* to the address control circuit 22 and selector circuits 24-a, 24-b (see FIG. 3).

The memory controllers 210-1 through 210-k are interconnected by suitable signal transmission lines. Although not shown, each memory controller is designed to send a ready signal Y to the memory controller in the preceding stage (or to one of the switches in the preceding stage in the case of the first-stage memory controller 210-1) when the corresponding data memory is empty; when the corresponding data memory is full (i.e., a cell is held inside), the memory controller transmits a request signal Q to the memory controller in the next stage (a full signal F is sent to the timing control circuit 23 in the case of the last-stage memory controller 210-k; see FIG. 3). Each of the memory controllers 210-1 through 210-k has circuitry needed to perform the C operation. Each memory controller outputs a memory write order signal W to the corresponding data memory when the C operation holds between a request signal Q and a ready signal Y (i.e., logical "1" is output when the signals Q and Y are logical "1's"), the request signal Q coming from the memory controller in the preceding stage (or from one of the switches in the preceding stage in the case of the first-stage memory controller 210-1 stage), the ready signal Y coming from the memory controller in the next stage (the signal Y is replaced by a read signal R from the timing control circuit 23 in the case of the last-stage memory controller 210-k).

If all data memories 200-1 through 200-k are empty, every memory controller transmits a ready signal Y to the memory controller in the preceding stage (or to one of the switches in the preceding stage). In this state, one of the switches in the preceding stage sends a request signal Q to the memory controller 210-1 in the first stage. The signal causes the first-stage data memory 200-1 to start a read operation. A cell at the beginning of the cell string C* coming from one of the switches in the preceding stage is written to the first-stage data memory 200-1 for temporary storage therein. With the first cell thus stored, the first-stage memory controller 210-1 outputs a request signal Q to the second-stage memory controller 210-2. This causes the first cell in the first-stage data memory 200-1 to be transferred to the second-stage data memory 200-2 and a second cell to be written to the first-stage memory 200-1.

The above operations are repeated. The received cell string C* is transferred successively, stored one cell at a time into each of the data memories from the first-stage memory 200-1 on up to the last-stage memory 200-k. If the number of the received cells is smaller than the number k of the data memories configured, the data memories start to be emptied from the first-stage memory 200-1 on during a cell string transfer. Thus the first-stage memory controller 210-1 keeps sending the ready signal Y to one of the switches in the preceding stage as long as the first-stage data memory 200-1 remains empty.

When the last-stage data memory 200-k accommodates a cell, the last-stage memory controller 210-k transmits a full signal F to the timing control circuit 23. This causes the timing control circuit 23 to send a read signal R to the last-stage memory controller 210-k. In turn, the cell in the data memory 200-k is read out and supplied to the address control circuit 22 and selector circuits 24. At the same time, the memory controller 210-k transmits a ready signal Y to the memory controller 210-(k−1) in the preceding stage. If the data memory 200-(k−1) holds a cell therein, that cell is read out and written to the data memory 200-k. The data memory 200-k holds the cell until the next read signal R arrives. In this manner, every time a read signal R is provided, one cell is output and a cell in each of the data memories 200 reaches the data memory in the next stage. In other words, every time a read signal R is furnished, the cell string C* in the data memories 200-1 through 200-k is shifted one stage downstream. The cells thus read out on a first-in first-out basis are supplied to the address control circuit 22 and selector circuits 24.

Suppose that some of the data memories, e.g., 200-i ($1<i<n$) through 200-k are full and that the upstream data memories preceding the memory 200-(i−1) are empty. In that case, a cell string C* from one of the switches in the preceding stage is placed into the data memories up to the memory 200-(i−1). Since the ready signal Y is not transmitted from the data memory 200-i which is full, the cell placed into the data memory 200-(i−1) is retained therein and the memory 200-(i−1) transmits a request signal Q to the data memory 200-1. In this manner, as long as there exist empty data memories, the input latch circuits 21 accept the request for admitting a cell string C* from one of the switches in the preceding stage until the whole data memories become full of cells.

In the unit switch 20 of FIG. 3, when cells are placed into the last-stage data memories 200-k of the paired input latch circuits 21-a, 21-b, the two circuits output one full signal F after another (Fa, Fb) in the order in which the cells were stored into the memories. On the other hand, when the two data memories of the paired switches in the next stage become empty, the switches output one ready signal Y after another (Yc, Yd) in the order in which the memories became empty. When the four signals have arrived, the timing control circuit 23 (FIG. 4) carries out a C operation causing the input latch circuits 21-a, 21-b to output the cells from the data memories 200-k. Under control of the timing control circuit 23, the last-stage data memories 200-k of the input latch circuits 21-a, 21-b forward the stored cells to the address control circuit 22 (FIG. 3) as well as to the two selector circuits 24-a, 24-b.

The address control circuit 22 interprets address information retained in the headers of the two cells sent from the data memories 200-k, identifies the destinations of the cells, and generates a selector control signal S accordingly. Given the control signal S, the selector circuits 24-a, 24-b perform a cell switching operation to send one of the cells to the switches in the next stage.

Having caused the input latch circuits 21-a, 21-b to perform the cell read operation, the timing control circuit 23 gets the address control circuit 22 and selector circuits 24-a, 24-b to start the switching while simultaneously sending the request signals Qc, Qd to the switches in the next stage, as described earlier. In short, the timing control circuit 23 controls the relevant circuits so that switching is started at the time when the paired input latch circuits 21-a, 21-b accommodate cell strings C*, when the last-stage data memories 200-k of the circuits 21-a, 21-b are ready to output their stored cells, and when the input latch circuits 21-a, 21-b of the switches in the next stage have empty data memories. The time for the timing control circuit 23 to output the result of the C operation (i.e., switching start time) comes only after all last-stage data memories 200-k are ready to output their cells (i.e., all cells have arrived). As a result, the time differences in arrival time between cells leading to malfunction of conventional switching systems are no longer the problem with the inventive system. There is no need to consider the time margin traditionally required to allow for the arrival time differences. With the time margin thus eliminated, the operating speed of the switching system is enhanced correspondingly. This in turn increases the throughput of the switching system.

Upon receipt of a request signal Q, the next-stage switches having empty data memories in the input latch circuits 21-a, 21-b store cells sent from the selector circuits 24-a, 24-b. In this manner, each of the unit switches forwards the switched cell to the next stage while receiving and transmitting a request signal Q and a ready signal Y. Free of timing control based on clock pulses, the cells pass through the unit switches 20 successively as they are switched in the switch array 2 (FIG. 1).

Figure 6:
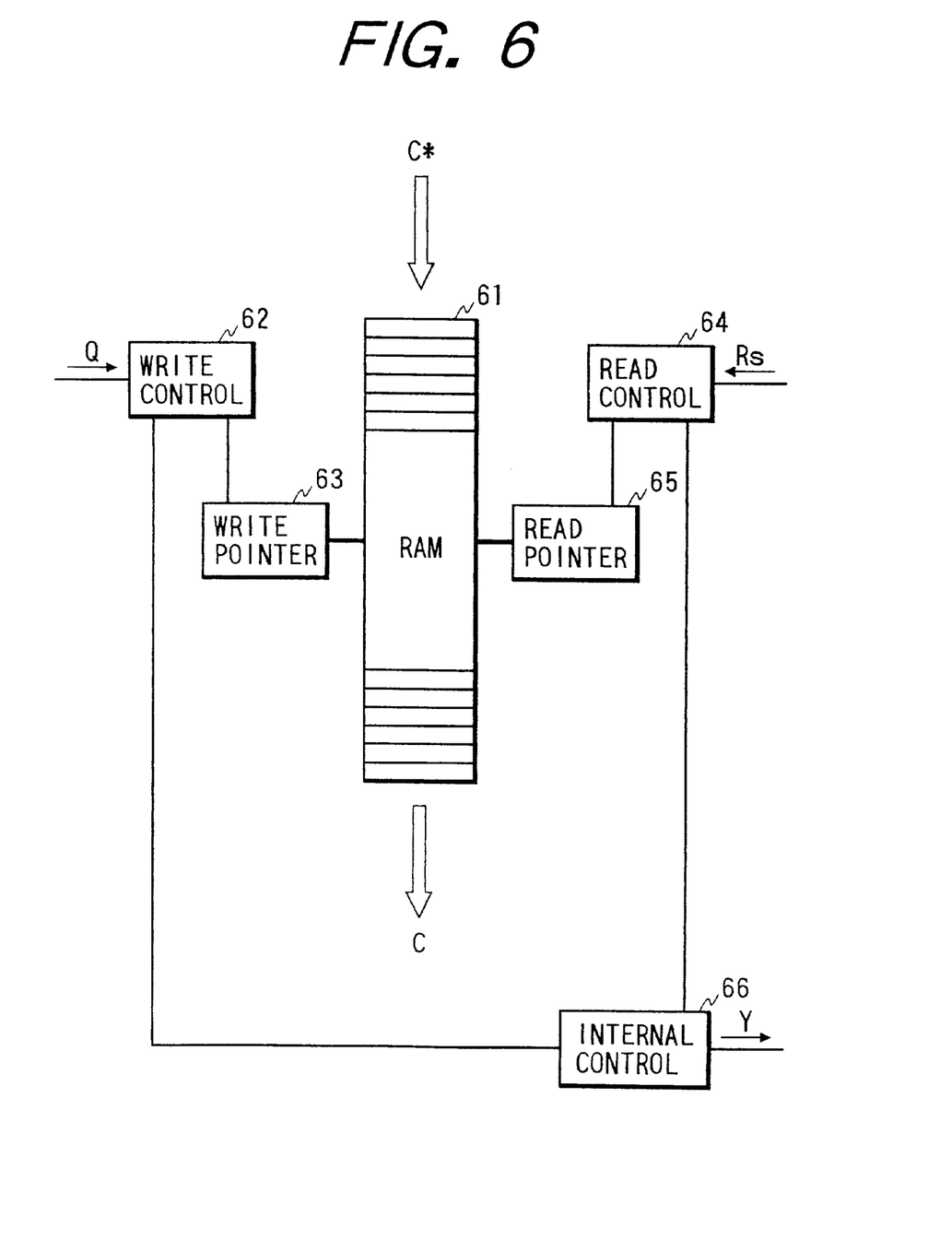
FIG. 6 is a circuit block diagram of a transmitting synchronous conversion circuit used by the switching system in FIG. 1.

The cell from one of the last-stage unit switches 20 is sent to any one of the transmitting synchronous conversion circuits 11-1 through 11-n. The successively sent cells constitute the switched cell string C*. Each transmitting synchronous conversion circuit 11 is the same in structure as the above-described receiving synchronous conversion circuit 10. An example of the transmitting synchronous conversion circuits 11-1 through 11-n is illustrated in FIG. 6. In FIG. 6, reference numeral 61 denotes a RAM that temporarily stores a cell string C* coming from the unit switch 20 in the last stage. The RAM 61 is of the same type as the RAM used in the receiving synchronous conversion circuit 10. The RAM 61 is a logical first-in first-out memory operating under actions of a write pointer 63 updated upon a write operation and a read pointer 65 updated upon a read operation. A write control circuit 62 controls the writing of a cell string C* to the RAM 61, and operates in response to a request signal Q sent together with the cell string C* from the last-stage unit switch 20. The request signal Q acts as a write signal when used by the transmitting synchronous conversion circuits 11. A read control circuit 64 controls the reading of a cell string from the RAM 61, and operates in accordance with a read signal Rs coming from the output interface circuits 41-1 through 41-n (FIG. 1). An internal state control circuit 66 detects the presence or absence of data (i.e., cell string) in the RAM 61 in concert with the write and read control circuits 62 and 64. Except when the RAM 61 is full of data and no data is read therefrom, the internal state control circuit 66 sends a ready signal Y to the last-stage unit switch 20.

Because the request signal Q is an asynchronous signal whose timing coincides with that of the cell string C*, the cell string C* is written to the RAM 61 in an asynchronous manner. Meanwhile, the output interface circuits 41 operate under timing control by clock pulses, and output the read signal Rs as a synchronous signal. A cell string is read from the RAM 61 in the order in which cells comprising the cell string were written thereto. The time to start the reading of the cell string is controlled by the synchronous read signal Rs fed to the read control circuit 64. It follows that the cell string thus read out is a synchronous cell string C. A read operation of a cell string by the read pointer 65 follows a write operation of the string cell by the write pointer 64. The internal state control circuit 66 outputs a ready signal Y every time one cell string has been written to the RAM 61, unless a delayed read of the RAM 61 following a write leaves the RAM full of data and no data is read therefrom. Although the transmitting synchronous conversion circuit shown in FIG. 6 does not use clock pulses, the read control circuit 64 and read pointer 65 may alternatively utilize clock pulses to control their workings. The synchronous cell string C sent from the transmitting synchronous conversion circuit 11 is output onto an external transmission line via the output interface circuit 41.

In the above-described switching system according to the invention, if there is any unit switch 20 whose input latch circuits 21-a, 21-b are all empty having no cell string C* supplied thereto, the timing control circuit 23 does not output the result of the C operation. That is, the unit switch 20 in question is in a stopped state with no switching operation carried out. By contrast, the clock-synchronized conventional switching system keeps its circuits activated by clock pulses with or without the presence of cell strings therein, thereby consuming power continuously. In particular, during low-load operation where the supply of cell strings C* is reduced, the conventional switching system as a whole dissipates power unproductively, compared with the inventive switching system in which a greater part of the circuits are at rest saving large amounts of power.

As described, the switching system according to the invention allows cells to be switched asynchronously and thereby eliminates the timing margin required of conventional clock-synchronized switching systems. The removal of timing margins and the resulting increase in throughput make it possible to implement a large-capacity high-speed switching system that is adapted advantageously to a broadband digital communication system for efficiently communicating diverse kinds of information. As another benefit, there is no need for the complicated and difficult timing design.

It is further understood by those skilled in the art that the foregoing description is a preferred embodiment of the disclosed device and that various changes and modifications may be made in the invention without departing from the spirit and scope thereof.

What is claimed is:

1. An asynchronous transfer mode switching system comprising:

a plurality of input interface circuits each for extracting a synchronous cell string transmitted over an external transmission line;

a plurality of receiving synchronous conversion circuits each for converting the extracted synchronous cell string into an asynchronous cell string;

a space-division switch array for switching the converted asynchronous cell strings;

a plurality of transmitting synchronous conversion circuits each for reconverting the switched asynchronous cell string to a synchronous cell string; and a plurality of output interface circuits each for sending the reconverted synchronous cell string to an external transmission line;

wherein said space-division switch array includes a plurality of asynchronous unit switches forming stages, each of said plurality of asynchronous unit switches having input terminals and output terminals and providing switching start control means for causing a switching operation to start upon detecting a stored state of the cell to be switched as well as a storage-ready state of a destination for the switched cell.

2. An asynchronous transfer mode switching system according to claim 1, wherein each of said plurality of asynchronous unit switches comprises:

a plurality of input latch circuits each for temporary storing cells comprising the asynchronous cell string;

a plurality of selector circuits each for selecting one of the cells read from said plurality of input latch circuits and for outputting said one of the cells as a switched cell; and an address control circuit for controlling the selecting operation of said plurality of selector circuits according to address information held in each of the cells; and wherein said switching start control means comprises a timing control circuit for performing Müller's C element-based logic operation upon receipt of two timing signals, one timing signal indicating that said plurality of input latch circuits are ready to read the cells, the other timing signal indicating that the input latch circuits of a destination for the switched cell are currently free to store a cell, said timing control circuit further outputting a cell read order signal and a read cell reception request signal in accordance with the result of the Müller's C element-based logic operation, said cell read order signal ordering each of said plurality of input latch circuits to read the cell in question, said read cell reception request signal requesting said destination for the switched cell to receive the read cell.

3. An asynchronous transfer mode switching system according to claim 2, wherein said plurality of input latch circuits are constituted by first-in first-out memory means.

4. An asynchronous transfer mode switching system according to claim 1, wherein each of said plurality of receiving synchronous conversion circuits comprises:

a memory for temporarily storing the synchronous cell string;

a write control circuit for controlling the writing of the synchronous cell string to the memory in accordance with a synchronous write signal supplied along with the synchronous cell string; and a read control circuit for controlling the reading of the synchronous cell string from the memory in accordance with an asynchronous read signal supplied from the unit switches in the first stage of said space-division switch array; and wherein each of plurality of said transmitting synchronous conversion circuits comprises:

a memory for temporarily storing the asynchronous cell string;

a write control circuit for controlling the writing of the asynchronous cell string to the memory in accordance with an asynchronous write signal supplied along with the switched cell string from the unit switches in the last stage of said space-division switch array; and a read control circuit for controlling the reading of the synchronous cell string from the memory in accordance with a synchronous read signal supplied from the corresponding output interface circuits.

5. An asynchronous transfer mode switching system according to claim 1, further comprising a clock generation circuit for supplying clock pulses to said plurality of input interface circuits and said plurality of output interface circuits.

6. An asynchronous transfer mode switching system according to claim 1, wherein each of said plurality of receiving synchronous conversion circuits comprises:

a memory for temporary storing the synchronous cell string;

a write control circuit for controlling the writing of the synchronous cell string to the memory in accordance with a synchronous write signal supplied along with the synchronous cell string; and a read control circuit for controlling the reading of the synchronous cell string from the memory in accordance with an asynchronous read signal supplied from the unit switches.

7. An asynchronous transfer mode switching system according to claim 6, wherein said memory corresponds to a logical first-in first-out random-access-memory.

8. An asynchronous transfer mode switching system according to claim 1, wherein each of said plurality of said transmitting synchronous conversion circuits comprises:

a memory for temporary storing the asynchronous cell string;

a write control circuit for controlling the writing of the asynchronous cell string to the memory in accordance with an asynchronous write signal supplied along with the switched cell string from the unit switches in the last stage of said space-division switch array; and a read control circuit for controlling the reading of the synchronous cell string from the memory in accordance with a synchronous read signal supplied from the corresponding output interface circuits.

9. An asynchronous transfer mode switching system according to claim 8, wherein said memory corresponds to a logical first-in first-out random-access-memory.

10. An asynchronous transfer mode switching system according to claim 9, further comprising a clock generator for supplying clock pulses to said plurality of input interface circuits and said plurality of output interface circuits.

11. A switching system, comprising:

a plurality of interface circuits which provide an interface to receive packets of data cells in a synchronous cell string from an external transmission line in synchronism with a system clock, and to send packets of data cells in a reconverted synchronous cell string to said external transmission line in accordance with said system clock;

a plurality of receiving synchronous conversion circuits which operate to convert the synchronous cell string received from said external transmission line into an asynchronous cell string;

a switch network of asynchronous unit switches with input and output terminals forming a plurality of serially connected network stages between said input and output terminals, which operates asynchronously and independently from said system clock to switch transmission of individual data cell of said asynchronous cell string via said serially connected network stages; and a plurality of transmitting synchronous conversion circuits which operate to convert said asynchronous cell string switched from said switch network into said reconverted synchronous cell string for sending to said external transmission line;

wherein each of said asynchronous unit switches comprises:

a plurality of input latches which temporary store data cells comprising the asynchronous cell string;

a plurality of selectors which select one of the data cells read from said plurality of input latches and output a selected data cell as a switched data cell;

an address control circuit which controls selection of said plurality of selectors according to address information contained in each of the data cells; and a timing control circuit which performs timing logic operation in accordance with two timing signals, one timing signal indicating that said plurality of input latches are ready to read the data cells, the other timing signal indicating that said plurality of input latches of a destination for the switched data cell are currently free to store a data cell, said timing control circuit further outputting a cell read order signal and a read cell reception request signal in accordance with said timing logic operation, said cell read order signal ordering each of said plurality of input latches to read the data cell in question, said read cell reception request signal requesting said destination for the switched data cell to receive the read data cell.

12. A switching system according to claim 11, wherein said plurality of input latches are constituted by first-in first-out memory means.

13. A switching system according to claim 11, wherein each of said plurality of transmitting synchronous conversion circuits comprises:
   a memory which temporary stores the asynchronous cell string;
   a write control circuit which controls the writing of the asynchronous cell string to the memory in accordance with an asynchronous write signal supplied along with the switched cell string from the unit switches in the last stage of said switch network; and
   a read control circuit which controls the reading of the synchronous cell string from the memory in accordance with a synchronous read signal supplied from the corresponding output interface circuits.

14. A switching system according to claim 13, wherein said memory corresponds to a logical first-in first-out random-access-memory.

15. A switching system according to claim 11, further comprising a clock generator for supplying said system clock to said plurality of interface circuits for operations.

16. A switching system, comprising:
   a plurality of interface circuits which provide an interface to receive packets of data cells in a synchronous cell string from an external transmission line in synchronism with a system clock, and to send packets of data cells in a reconverted synchronous cell string to said external transmission line in accordance with said system clock;
   a plurality of receiving synchronous conversion circuits which operate to convert the synchronous cell string received from said external transmission line into an asynchronous cell string;
   a switch network of asynchronous unit switches with input and output terminals forming a plurality of serially connected network stages between said input and output terminals, which operates asynchronously and independently from said system clock to switch transmission of individual data cell of said asynchronous cell string via said serially connected network stages; and
   a plurality of transmitting synchronous conversion circuits which operate to convert said asynchronous cell string switched from said switch network into said reconverted synchronous cell string for sending to said external transmission line;
   wherein each of said plurality of receiving synchronous conversion circuits comprises:
      a memory which temporary stores the synchronous cell string;
      a write control circuit which controls the writing of the synchronous cell string to the memory in accordance with a synchronous write signal supplied along with the synchronous cell string; and
      a read control circuit which controls the reading of the synchronous cell string from the memory in accordance with an asynchronous read signal supplied from the unit switches.

17. A switching system according to claim 16, wherein said memory corresponds to a logical first-in first-out random-access-memory.

18. A switching system, comprising:
   a plurality of interface circuits which provide an interface to receive packets of data cells in a synchronous cell string from an external transmission line in synchronism with a system clock, and to send packets of data cells in a reconverted synchronous cell string to said external transmission line in accordance with said system clock;
   a plurality of synchronous conversion circuits which operate to convert the synchronous cell string received from said external transmission line into an asynchronous cell string, and to convert said asynchronous cell string switched from said switch network into said reconverted synchronous cell string for sending to said external transmission line; and
   a switch network of asynchronous unit switches with input and output terminals forming a plurality of serially connected network stages between said input and output terminals, which operates asynchronously and independently from said system clock to switch transmission of individual data cell of said asynchronous cell string via said serially connected network stages, wherein each asynchronous unit switches comprises:
      a plurality of input latches which temporary store data cells comprising the asynchronous cell string;
      a plurality of selectors which select one of the data cells read from said plurality of input latches and output a selected data cell as a switched data cell;
      an address control circuit which controls the selection of said plurality of selectors according to address information contained in each of the data cells; and
      a timing control circuit which controls the time for starting said switching operation, wherein said timing control circuit controlling the time for starting said switching operation in accordance with two timing signals, one timing signal indicating that said plurality of input latches are ready to read the data cells, the other timing signal indicating that said plurality of input latches of a destination for the switched data cell are currently free to store a data cell, said timing control circuit further outputting a cell read order signal and a read cell reception request signal in accordance with said two timing signals, said cell read order signal ordering each of said plurality of input latches to read the data cell in question, said read cell reception request signal requesting said destination for the switched data cell to receive the read data cell.

19. A switching system according to claim 18, wherein each of said plurality of synchronous conversion circuits for converting the synchronous cell string received from said external transmission line into an asynchronous cell string comprises:
   a memory which temporary stores the synchronous cell string;
   a write control circuit which controls the writing of the synchronous cell string to the memory in accordance with a synchronous write signal supplied along with the synchronous cell string; and
   a read control circuit which controls the reading of the synchronous cell string from the memory in accordance with an asynchronous read signal supplied from the unit switches.

20. A switching system according to claim 19, wherein said memory corresponds to a logical first-in first-out random-access-memory.

21. A switching system according to claim 18, wherein each of said plurality of said synchronous conversion circuits for converting said asynchronous cell string switched from said switch network into said reconverted synchronous cell string comprises:

a memory which temporary stores the asynchronous cell string;

a write control circuit which controls the writing of the asynchronous cell string to the memory in accordance with an asynchronous write signal supplied along with the switched cell string from the unit switches in the last stage of said switch network; and a read control circuit which controls the reading of the synchronous cell string from the memory in accordance with a synchronous read signal supplied from the corresponding output interface circuits.

22. A switching system according to claim 21, wherein said memory corresponds to a logical first-in first-out random-access-memory.

23. A switching system according to claim 18, further comprising a clock generator for supplying said system clock to said plurality of interface circuits for operations.

\* \* \* \* \*